(12) United States Patent
Hipwell, Jr. et al.

(10) Patent No.: US 6,697,232 B1
(45) Date of Patent: Feb. 24, 2004

(54) BONDED TRANSDUCER-LEVEL ELECTROSTATIC MICROACTUATOR FOR DISC DRIVE SYSTEM

(75) Inventors: Roger L. Hipwell, Jr., Eden Prairie, MN (US); Wayne A. Bonin, North Oaks, MN (US); Lee Walter, Plymouth, MN (US); Barry D. Wissman, Ann Arbor, MI (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 123 days.

(21) Appl. No.: 09/809,378

(22) Filed: Mar. 15, 2001

Related U.S. Application Data
(60) Provisional application No. 60/192,101, filed on Mar. 24, 2000.

(51) Int. Cl.$^7$ .............................. G11B 21/24; G11B 5/56; G11B 5/60; G11B 15/64; G11B 17/32; G11B 21/20
(52) U.S. Cl. .............................. 360/294.5; 360/294.2; 360/234.7
(58) Field of Search ........................ 360/294.2, 294.3, 360/294.5, 294.1, 294, 290, 240, 234.7, 234.8

(56) References Cited

U.S. PATENT DOCUMENTS

| | | | |
|---|---|---|---|
| 3,924,268 A | 12/1975 | McIntosh et al. | 360/78.05 |
| 4,374,402 A | 2/1983 | Blessom et al. | 360/266.2 |
| 4,651,242 A | 3/1987 | Hirano et al. | 360/254.3 |
| 4,764,829 A | 8/1988 | Makino | 360/294 |
| 4,914,725 A | 4/1990 | Belser et al. | 318/560 |
| 5,021,906 A | 6/1991 | Chang et al. | 360/235.1 |
| 5,034,828 A | 7/1991 | Ananth et al. | 360/75 |
| 5,177,652 A | 1/1993 | Yamaguchi et al. | 360/78.05 |
| 5,189,578 A | 2/1993 | Mori et al. | 360/294.6 |
| 5,303,105 A | 4/1994 | Jorgenson | 360/294.3 |

(List continued on next page.)

FOREIGN PATENT DOCUMENTS

| | | |
|---|---|---|
| EP | 0 412 221 B1 | 11/1989 |
| JP | 63-122069 | 5/1988 |
| JP | 02-263369 | 4/1989 |
| JP | 04-134681 | 5/1992 |
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995, p. 2964–6.

(List continued on next page.)

*Primary Examiner*—Julie Anne Watko
(74) *Attorney, Agent, or Firm*—Kinney & Lange, P.A.

(57) ABSTRACT

A slider assembly is operable to selectively alter a position of a transducing head with respect to a track of a rotatable disc having a plurality of concentric tracks. The slider assembly includes a slider wafer arranged to be supported by a disc drive support structure. A stator is bonded to the slider wafer, with the stator including at least one electrode. A rotor is bonded to the stator, with the rotor having a frame portion bonded to the stator and a head-carrying portion attached to the frame portion by a flexible beam structure. The head-carrying portion of the rotor carries the transducing head, supports at least one rotor electrode adjacent to the at least one stator electrode, and is movable with respect to the frame portion of the rotor in response to a voltage difference between the at least one rotor electrode and the at least one stator electrode.

18 Claims, 7 Drawing Sheets

U.S. PATENT DOCUMENTS

| | | | |
|---|---|---|---|
| 5,364,742 A | 11/1994 | Fan et al. | 430/317 |
| 5,375,033 A | 12/1994 | MacDonald | 361/281 |
| 5,521,778 A | 5/1996 | Boutaghou | 360/264.5 |
| 5,657,188 A | 8/1997 | Jurgenson et al. | 360/294.3 |
| 5,745,319 A | 4/1998 | Takekado et al. | 360/78.05 |
| 5,764,444 A | 6/1998 | Imamura et al. | 360/294.4 |
| 5,781,381 A | 7/1998 | Koganezawa et al. | 360/294.3 |
| 5,796,558 A | 8/1998 | Hanrahan et al. | 360/294.6 |
| 5,801,472 A | 9/1998 | Wada et al. | 310/309 |
| 5,805,375 A | 9/1998 | Fan et al. | 360/78.12 |
| 5,856,896 A | 1/1999 | Berg et al. | 360/245.3 |
| 5,867,347 A | 2/1999 | Knight et al. | 360/294.5 |
| 5,896,246 A | 4/1999 | Budde et al. | 360/244.4 |
| 5,898,541 A | 4/1999 | Boutaghou et al. | 360/294.4 |
| 5,898,544 A | 4/1999 | Krinke et al. | 360/264.5 |
| 5,920,441 A | 7/1999 | Cunningham et al. | 360/78.05 |
| 5,936,805 A | 8/1999 | Imaino | 360/294.5 |
| 5,959,808 A | 9/1999 | Fan et al. | 360/294.3 |
| 6,239,947 B1 * | 5/2001 | Fan et al. | 360/245.9 |
| 6,259,584 B1 * | 7/2001 | Cini et al. | 360/294.6 |
| 6,487,045 B1 * | 11/2002 | Yanagisawa | 360/236.5 |

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995, p. 222–33.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996, p. 3908–10.

"Transverse Mode Electrostatic Microactuator for MEMS–Based HDD Slider" by Imamura et al, *IEEE* 1996, p. 216–21.

"An Experiment for Head Positioning System Using Sub-micron Track–width GMR Head" by Yoshikawa et al., *IEEE Transactions on Magnetics*, vol. 32, No. 5, Sep. 1996, p. 3905–7.

"Micro Electrostatic Actuators in Dual–Stage Disk Drives with High Track Density" by Tang et al., *IEEE Transactions on Magnetics*, vol. 32, No. 5, Sep. 1996, p. 3851–3.

"Piezoelectric Microactuator Compensating for Off–Track Errors in Magnetic Disk Drives" by Imamaura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991, p. 5298–300.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991, p. 5079–81.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

* cited by examiner

US 6,697,232 B1

BONDED TRANSDUCER-LEVEL ELECTROSTATIC MICROACTUATOR FOR DISC DRIVE SYSTEM

CROSS-REFERENCE TO RELATED APPLICATION(S)

This application claims priority from Provisional Application No. 60/192,101 filed Mar. 24, 2000 for "Bonded Transducer-Lever Electrostatic Microactuator for Magnetic Recording" by R. Hipwell, Jr., W. Bonin, L. Walter, B. Wissman and Z. Boutaghou.

INCORPORATE BY REFERENCE

The aforementioned Provisional Application No. 60/192, 101 is hereby incorporated by reference in its entirety.

BACKGROUND OF THE INVENTION

The present invention relates to a disc drive microactuator, and more particularly to a high resolution positioning mechanism for selectively moving a transducer portion of the slider radially with respect to circumferential data tracks of a rotatable disc.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuator motor, such as a voice coil motor, to position a head on a flexure at the end of the actuator arm. The large-scale motor lacks sufficient resolution and bandwidth to effectively accommodate high track-density discs. Thus, a high resolution head positioning mechanism is necessary to accommodate the more densely spaced tracks.

One promising design for high resolution head positioning involves employing a high resolution microactuator in addition to the conventional low resolution actuator motor, thereby effecting head positioning through dual-stage actuation. Various microactuator designs have been considered to accomplish high resolution head positioning, including piezoelectric, electromagnetic, electrostatic, capacitive, fluidic, and thermal actuators. Various locations for the microactuator have been suggested, including on the slider, on the gimbal, at the interface between the gimbal and the slider, and on the actuator arm, for example. However, the previous designs have had shortcomings that limited the effectiveness of the microactuator, such as substantial performance limitations or manufacturing complexities, which make the microactuator designs impractical. An effective microactuator design must provide high acceleration in positioning the head while also generating sufficiently large and accurate displacements to precisely move the head across several data tracks on the disc.

There is a need in the art for a microactuator design to provide high resolution head positioning with superior bandwidth performance characteristics that can be implemented by simple and readily available manufacturing processes.

BRIEF SUMMARY OF THE INVENTION

The present invention is a slider assembly for selectively altering a position of a transducing head with respect to a track of a rotatable disc having a plurality of concentric tracks. A slider wafer is arranged to be supported by a disc drive support structure. A stator is bonded to the slider wafer, with the stator including at least one electrode. A rotor is bonded to the stator wafer, with the rotor having a frame portion bonded to the stator and a head-carrying portion attached to the frame portion by a flexible beam structure. The head-carrying portion of the rotor carries the transducing head, supports at least one rotor electrode adjacent to the at least one stator electrode, and is movable with respect to the frame portion of the rotor in response to a voltage difference between the at least one rotor electrode and the at least one stator electrode.

In accordance with the present invention, the slider assembly is fabricated by forming a slider body arranged to be supported by disc drive support structure, forming a stator, bonding the stator to the slider body, forming at least one stator electrode in the stator, forming a rotor, forming a transducing head on the rotor, forming at least one rotor electrode in the rotor, bonding the rotor to the stator, and forming a beam structure in the rotor, thereby forming a frame portion bonded to the stator and a head-carrying portion connected to the frame portion by the beam structure.

DETAILED DESCRIPTION OF THE PREFERRED EMBODIMENTS

Figure 1:
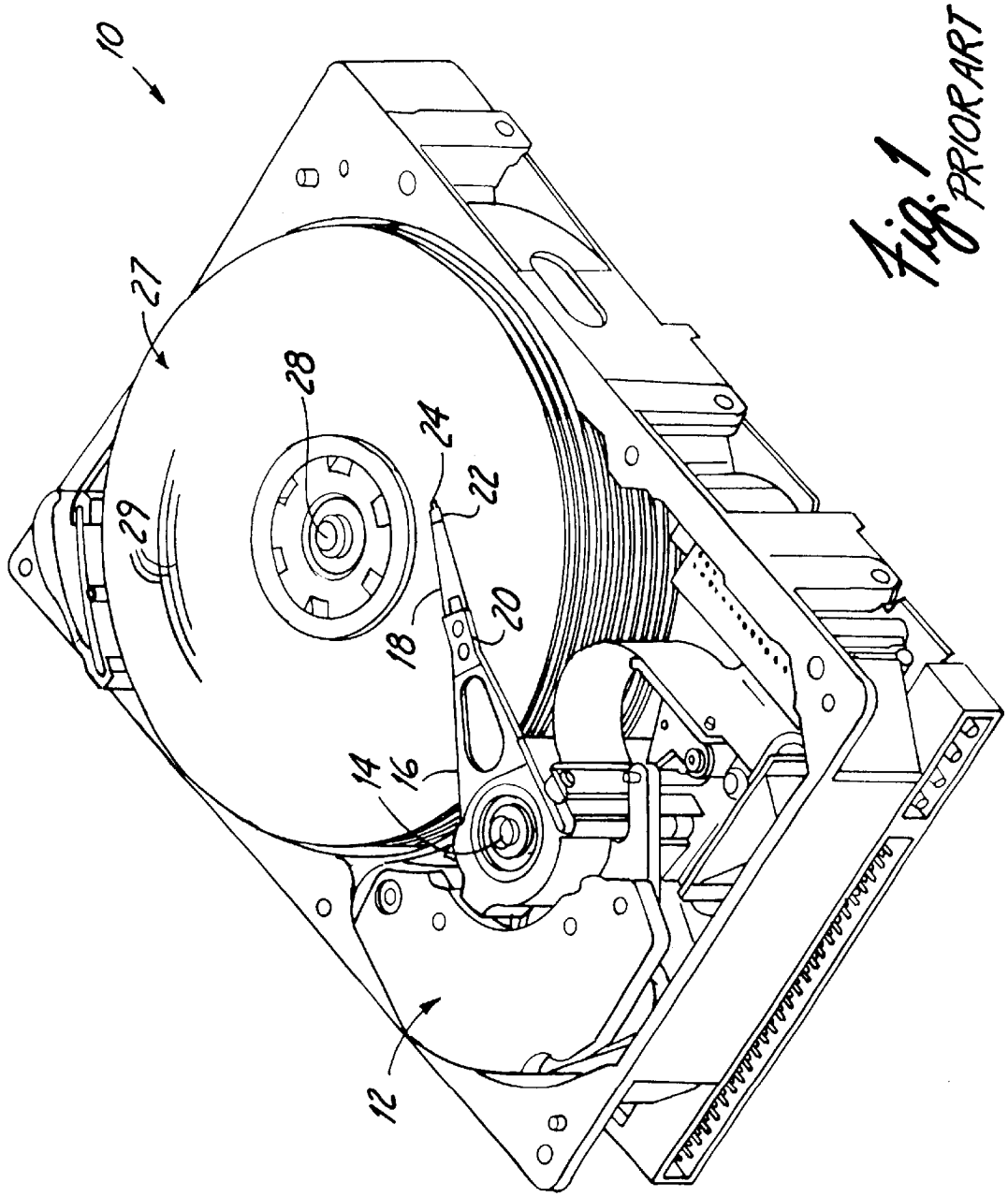
FIG. 1 is a perspective view of a prior art disc drive actuation system for positioning a slider over tracks of a disc.

FIG. 1 is a perspective view of a prior art disc drive actuation system 10. Actuation system 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on disc 27, which rotates around axis 28 and includes concentric tracks 29 on which the data is written. As disc 27 rotates, windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely, over a selected track of disc 27. Therefore, a higher resolution actuation device is necessary.

Figure 2:
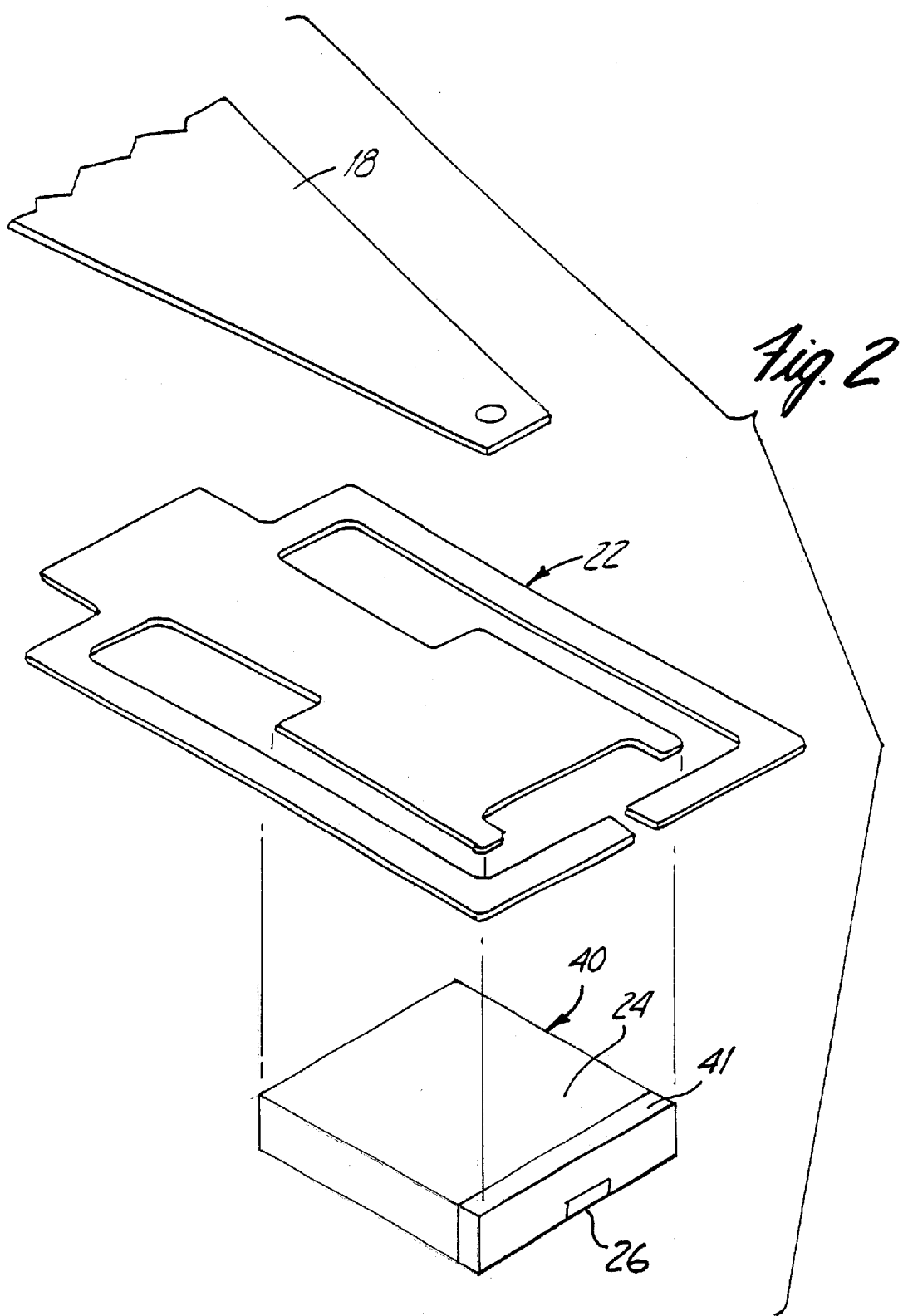
FIG. 2 is an exploded perspective view of a portion of a disc drive including a slider assembly employing a microactuator according to the present invention.

FIG. 2 is an exploded perspective view of a portion of a disc drive including slider assembly 40 according to the present invention. Flexure 22 is attached to load beam 18, and slider assembly 40 is attached to flexure 22 so that slider body 24 is carried above a surface of disc 27 (FIG. 1). Transducing head 26 is carried by head carrying portion 41 of slider assembly 40 to transduce data with the disc.

In operation of the disc drive, load beam 18 and flexure 22 carrying slide assembly 40 are all moved together as coarse positioning is performed by VCM 12 (FIG. 1) moving actuator arm 16 (FIG. 1). To achieve fine positioning of transducing head 26, a microactuator (not shown in FIG. 2 for the sake of simplicity) employed by slider assembly 40 operates to displace head-carrying portion 41 of slider assembly 40 with respect to main slider body 24. As a result, transducing head 26 is displaced with high resolution for precise positioning over a selected track of the disc.

Figure 3:
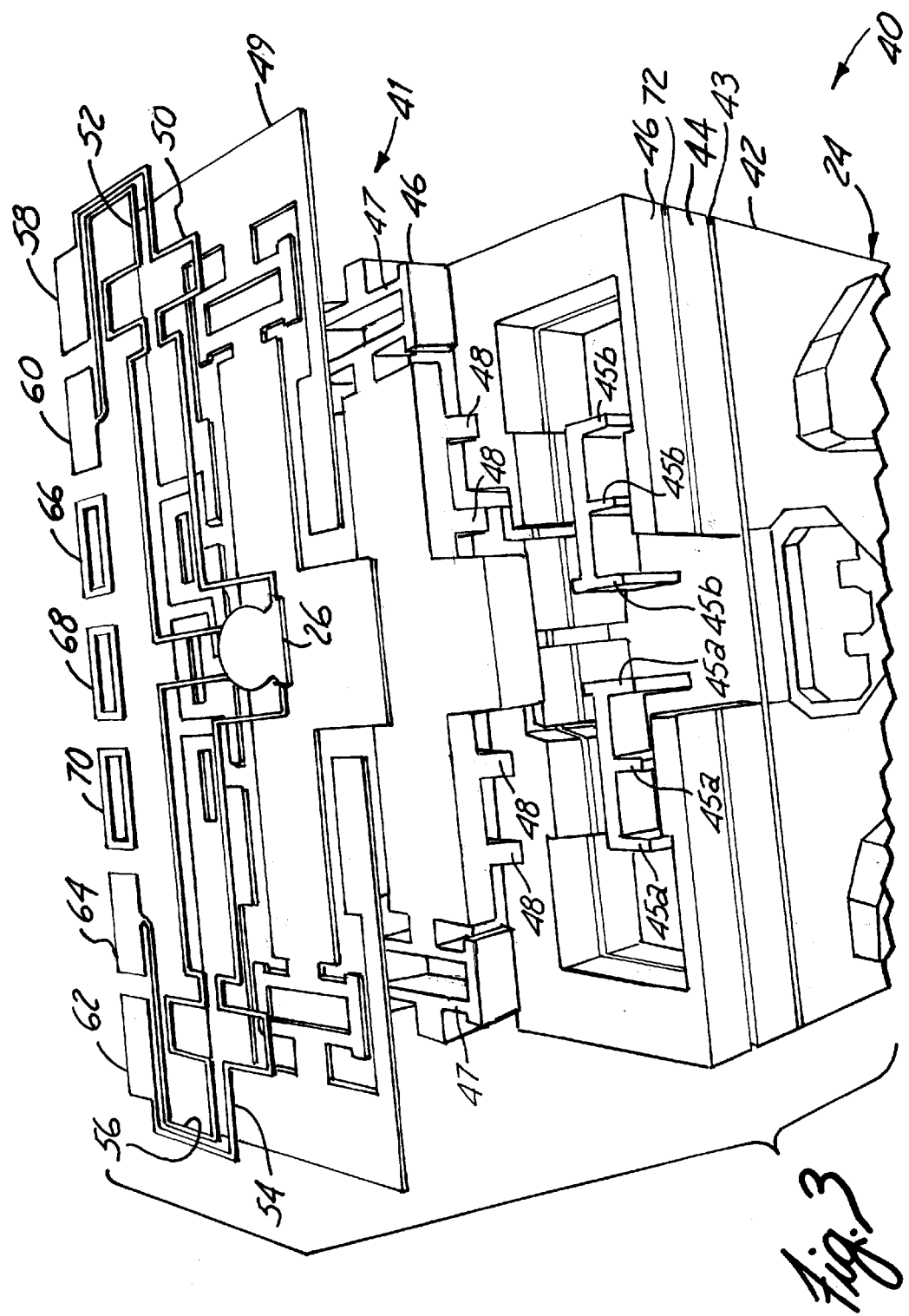
FIG. 3 is an exploded perspective view of the trailing edge portion of a slider assembly according to the present invention.

FIG. 3 is an exploded perspective view of slider assembly 40 according to the present invention. Slider assembly 40 includes slider body 24 having slider wafer 42 and microactuator stator wafer 44 bonded thereto. Slider wafer 42 and stator wafer 44 are composed of a standard wafer material such as silicon or the like. Microactuator stator wafer 44 is bonded to slider wafer 42 by insulating interlayer film 43 composed of a material such as silicon dioxide or the like. Microactuator stator wafer 44 is patterned with stator electrodes 45a and 45b and standoff posts by a process known in the art such as deep-trench reactive ion etching (DTRIE) to form high resolution features. Microactuator rotor wafer 46 is patterned with rotor electrodes 48 to interdigitate with stator electrode 45a and 45b patterned in stator wafer 44 and form the basis for an electrostatic microactuator motor. Folded beams 47 are formed in microactuator rotor wafer 56 to suspend rotor electrodes 48 and permit movement of rotor electrodes 48 with respect to the main frame of rotor wafer 46. Although the outer portion of rotor wafer 46 and the inner portion of rotor wafer 46 including folded beams 47 and rotor electrodes 48 are shown as separated in FIG. 3 for the purpose of illustration, it should be understood that both portions of rotor wafer 46 are continuous and are part of the same wafer structure, bonded to stator wafer 44 on the outer frame portion and suspending rotor electrodes 48 adjacent to stator electrodes 45a and 45b on the inner portion. Insulating layer 49 is formed on rotor wafer 46, and electrical connections to transducing head 26 are made by conductive traces 50, 52, 54 and 56 on insulating layer 49, with conductive traces 50, 52, 54 and 56 connecting to bond pads 58, 60, 62 and 64. Electrical connections to stator electrodes 45a are made through a via conductively connected to bond pad 68, electrical connections to stator electrodes 45b are made through a via conductively coupled to bond pad 66, and electrical connections to rotor electrodes 48 are made through vias conductively coupled to bond pad 70. In the exemplary embodiment shown in FIG. 3, completed rotor wafer 46 is bonded to stator wafer 44 by conductive (i.e. non-insulating) interlayer film 72, which does not electrically isolate the stator from the rotor and therefore enables electrical connections to be made to stator electrodes 45a and 45b and to rotor electrodes 48 by bond pads 66, 68 and 70 on the trailing edge surface of slider assembly 40. Alternatively, a method such as direct silicon bonding could be used, which does not use interlayer film 72 between rotor wafer 46 and stator wafer 44 and also does not electrically isolate the stator from the rotor. In an alternate embodiment, stator wafer 44 and rotor wafer 46 may be bonded together with an insulating interlayer film, which would require electrical connections to stator electrodes 45a and 45b and to rotor electrodes 48 via other means.

Figure 4:
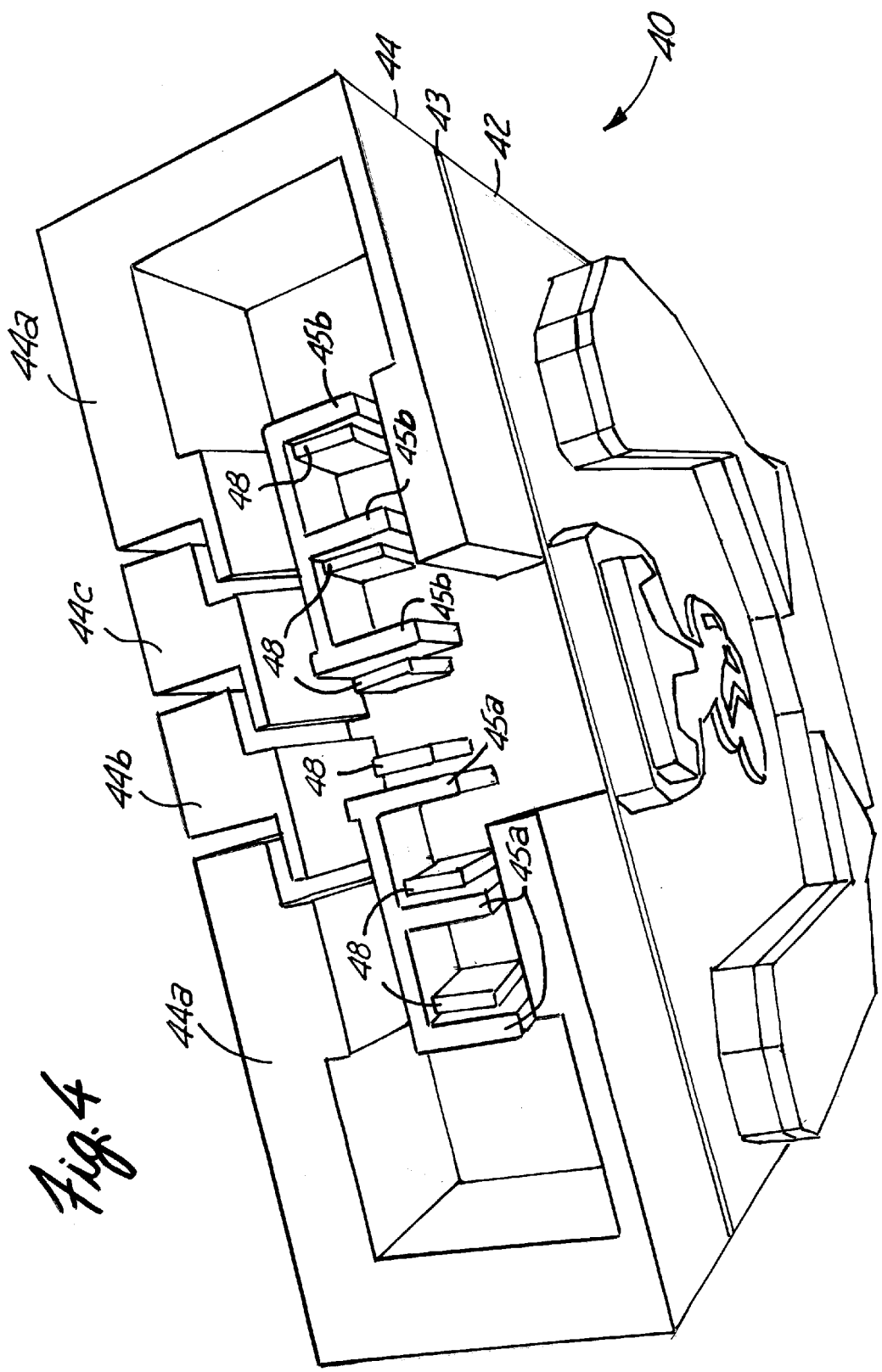
FIG. 4 is a cut away perspective view of the electrode arrangement utilized in the slider assembly of the present invention.

FIG. 4 is a cut away perspective view illustrating the arrangement of stator electrode 45a and 45b with respect to rotor electrodes 48 in slider assembly 40 of the present invention. Rotor electrodes 48 are interdigitiated with a first set of stator electrodes 45a on one lateral side of the trailing edge of slider assembly 40 and with a second set of stator electrodes 45b on the opposite lateral side of the trailing edge of slider assembly 40. Rotor electrodes 48 are suspended adjacent stator electrodes 45a and 45b to permit their movement with respect to stator electrodes 45a and 45b in response to a differential voltage applied therebetween. Stator electrodes 45a are connected to stator portion 44b for coupling to a first voltage, stator electrodes 45b are connected to stator portion 44c for coupling to a second voltage, and rotor electrodes 48 are connected through rotor wafer 46 (FIG. 3) to main stator portion 44a for coupling to a third voltage. Stator portions 44a, 44b and 44c are electrically isolated from one another to enable each portion to have a separate voltage associated therewith.

In operation, slider assembly 40 shown in FIGS. 3 and 4 achieves selective microactuation of transducing head 26 through electrostatic principles. Application of a differential voltage between stator electrodes 45a and 45b and rotor electrodes 48 causes a selectively attractive force therebetween, which forces rotor electrodes 48 to move laterally with respect to stator electrodes 45a and 45b. This lateral movement is permitted by the configuration of folded beams 47 (FIG. 3) suspending rotor electrodes 48 adjacent to stator electrodes 45a and 45b. The movement of rotor electrodes 48 is transferred by the rotor arrangement to effect lateral movement of transducing head 26. The movement of transducing head 26 is precisely controllable based on the voltage difference applied between stator electrodes 45a and 45b and rotor electrodes 48, based on the known characteristics of the electrodes and the known spring constant associated with folded beam structure 47 (FIG. 3). The microactuator design is effective to position transducing head 26 with extremely high frequency, since the mass of the portion of slider assembly 40 being moved is quite small, with only a portion of rotor wafer 46 being displaced to achieve microactuation.

Figure 5:
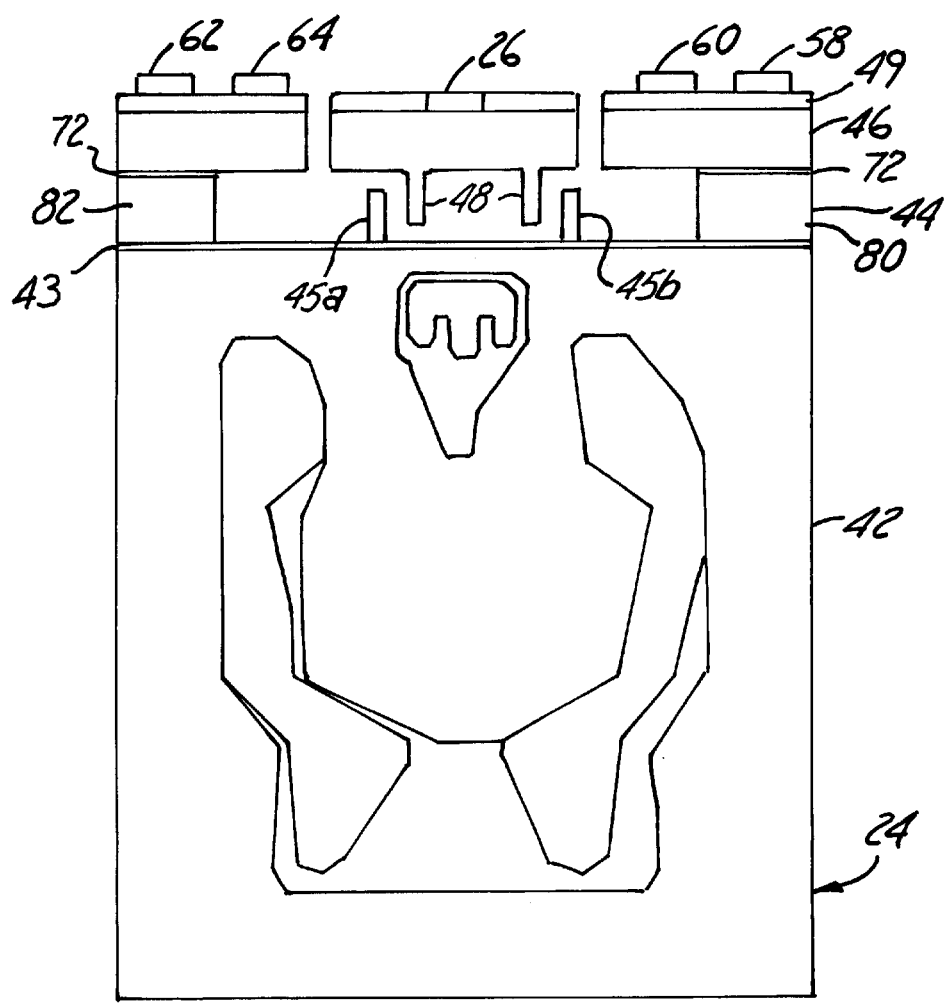
FIG. 5 is a bottom view of the slider assembly of the present invention illustrating the layers that make up the microactuator.

FIG. 5 is a bottom view of slider assembly 40 illustrating the layers that make up the microactuator arrangement in an exemplary embodiment of the present invention. The embodiment shown in FIG. 5 is simplified so that the general process flow for forming slider assembly 40 can be illustrated clearly. As the process flow is described, differences from the exemplary embodiment shown in FIGS. 3 and 4 are specifically explained.

As shown in FIG. 5, slider wafer 42 is bonded to patterned stator wafer 44 by interlayer film 43, which is composed of an insulating material such as silicon dioxide. Stator wafer 44 includes patterned electrodes 45a and 45b and standoffs 80 and 82. Rotor wafer 46 is mechanically bonded to stator wafer 44 at standoffs 80 and 82 by interlayer film 72, with rotor electrodes 48 suspended adjacent stator electrodes 45a and 45b. Interlayer film 72 is optional in the simplified embodiment shown in FIG. 5, since rotor wafer 46 and stator wafer 44 may need to be electrically connected together at the outer frame of the microactuator, depending on the specific embodiment. Therefore, if interlayer film 72 is utilized in such an embodiment, it must be composed of a conductive material. A bonding method which does not use interlayer film 72, such as direct silicon bonding, could alternatively be used and would also not result in any electrical isolation between the bonding surfaces. Rotor wafer 46 carries transducing head 26, which is laterally movable in response to lateral movement of rotor electrodes 48 due to application of a potential difference between stator electrodes 45a and 45b and rotor electrodes 48. Bond pads 58, 60, 62 and 64 are provided for electrical connection to transducing head 26. Additional bond pads are provided for conducting coupling to stator electrodes 45a and 45b and to rotor electrodes 48, but these are not shown in FIG. 5 for the sake of simplicity and clarity in describing the process flow of the invention.

FIGS. 6–11 are diagrams illustrating a process of forming slider assembly 40 according to an exemplary embodiment of the present invention. Although the diagrams of FIGS. 6–11 illustrate the formation of a single slider assembly, it will be understood by those skilled in the art that fabrication will preferably occur at the wafer level, before singulation of individual slider assemblies, for improved efficiency. Additionally, some features of slider assembly 40 are not shown in FIGS. 6–11 in order to more clearly illustrate the inventive features of the fabrication process.

Figure 6:
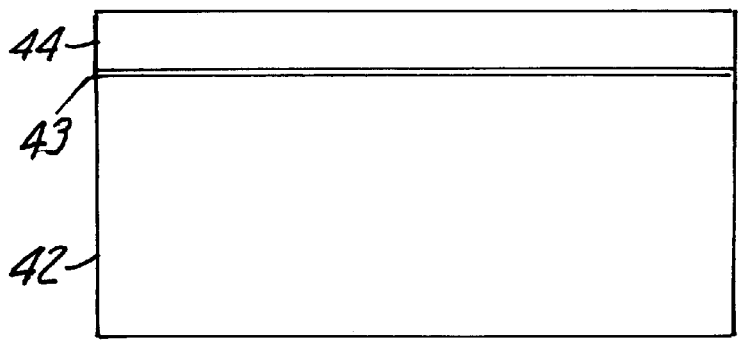
FIGS. 6–11 are diagrams illustrating a process of forming the slider assembly according to the present invention.

As shown in FIG. 6, the initial step is to bond stator wafer 44 to slider wafer 42. Both slider wafer 42 and stator wafer 44 may be composed of a standard wafer material such as silicon, for example. Interlayer film 43 bonding slider wafer 42 to stator wafer 44 is formed of an insulating material such as silicon dioxide.

Figure 7:
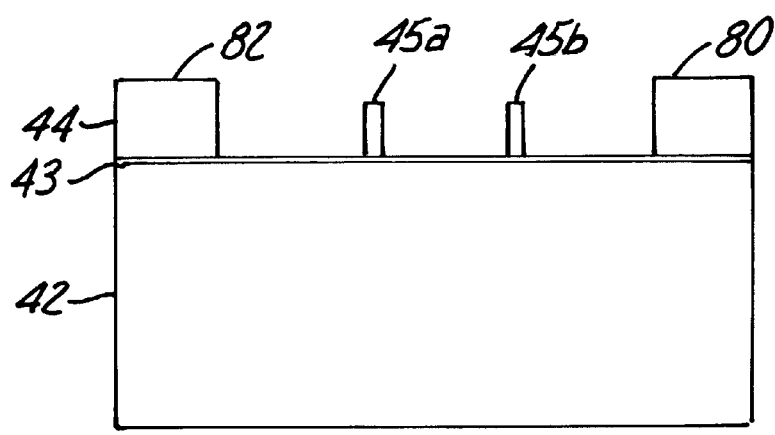

FIG. 7 illustrates the step of patterning stator wafer 44 with stator electrodes 45a and 45b and standoffs 80 and 82. The formation of these features is accomplished by a high resolution fabrication process such as deep trench reactive ion etching (DTRIE) or a similar process known to those skilled in the art. Standoffs 80 and 82 have a height that is greater than the height of stator electrodes 45a and 45b, in order to ensure clearance between the rotor to be bonded to stator wafer 44 at standoffs 80 and 82 and stator electrodes 45a and 45b.

Figure 8:
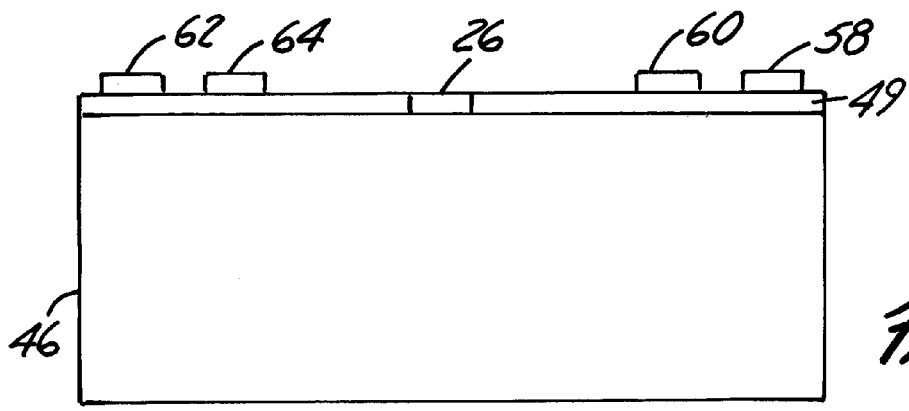

FIG. 8 illustrates the step of forming transducing head 26 and bond pads 58, 60, 62 and 64 on the side of rotor wafer 46 that will form the trailing edge of slider assembly 40. Transducing head 26 is formed according to well-known head processing techniques. Insulating layer 49 is deposited on rotor wafer 46, and bond pads 58, 60, 62 and 64 are fabricated on insulating layer 49 by well-known methods such as etching, plating or the like. Bond pads 58, 60, 62 and 64 are electrically coupled to transducing head 26 by well-known techniques in the art, not shown in FIG. 8 for the purpose of clarity. After the features have been formed on the trailing edge of rotor wafer 46, the opposite side of rotor wafer 46 is thinned and polished to the desired thickness for the mechanical structure of the rotor and for formation of rotor electrodes. In a preferred embodiment, a sacrificial protective coating is provided to protect the sensitive elements of transducing head 26 during the thinning and polishing step, and shorting shunts are incorporated to prevent damage due to electrostatic discharge (ESD).

Figure 9:
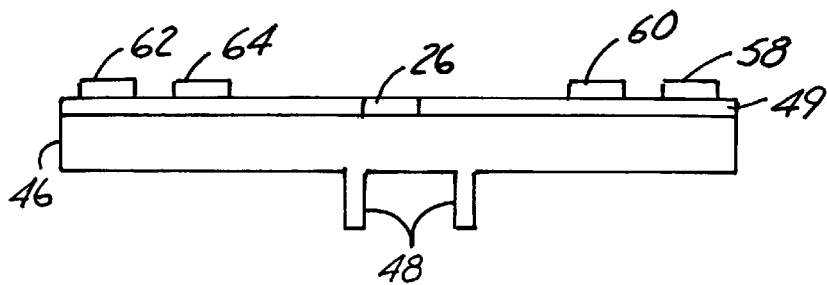

FIG. 9 illustrates the step of patterning rotor electrodes 48 on the side of rotor wafer 46 opposite transducing head 26. Rotor electrodes 48 are formed by a process well-known in the art such as etching or the like.

Figure 10:
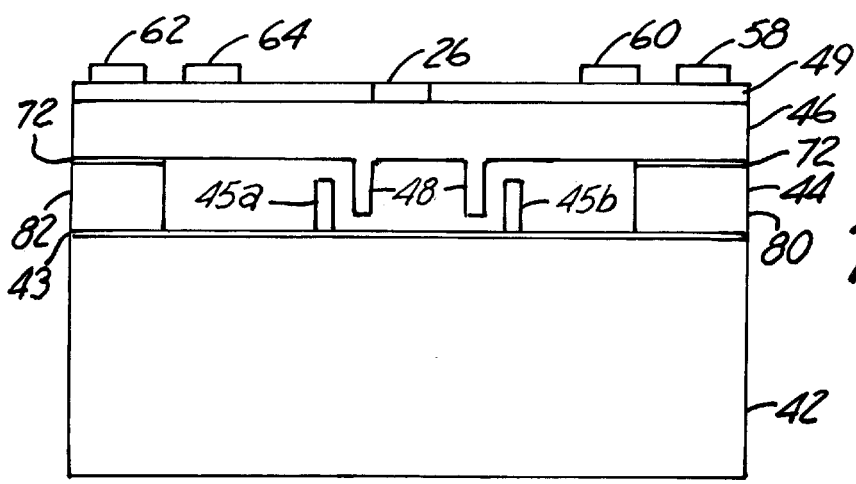

FIG. 10 illustrates the step of bonding rotor wafer 46 to stator wafer 44. The body of rotor wafer 46 is bonded to standoffs 80 and 82 of stator wafer 44 by either conductive interlayer film 72 or by a suitable bonding process that does not utilize an interlayer film, so that the outer frame of rotor wafer 46 is conductively coupled to stator wafer 44. In an alternate embodiment, interlayer film 72 may be composed of an insulating material, in which case an alternative means of making electrical connections to the stator and the rotor may be necessary. After bonding of rotor wafer 46 to standoffs 80 and 82 of stator wafer 46, rotor electrodes 48 are suspended adjacent stator electrodes 45a and 45b.

Figure 11:
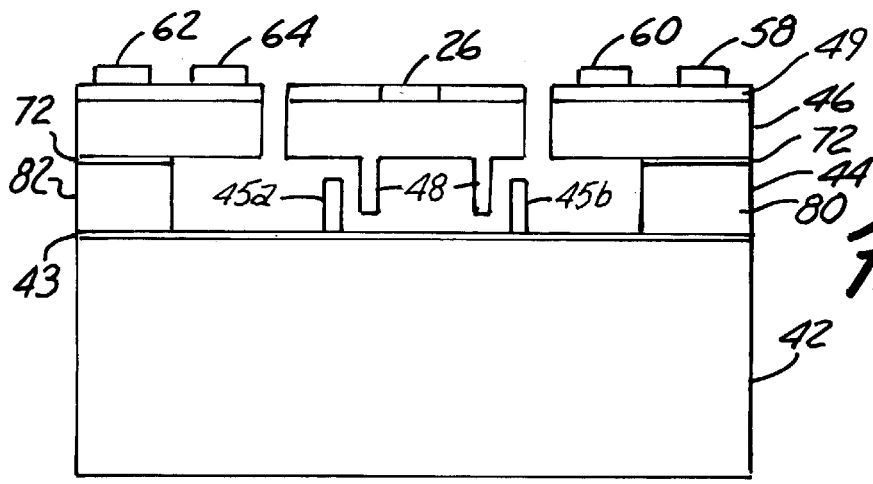

FIG. 11 illustrates the step of forming the mechanical structure of rotor wafer 46 in order to permit movement of rotor electrodes 72 and transducing head 26 in response to a voltage difference applied between stator electrodes 72 and 74 and rotor electrodes 76. Rotor wafer 46 is etched, or similarly fabricated, with a patterned flexible beam structure that mounts the transducer-carrying portion of rotor wafer 46 to the outer frame of rotor wafer 46 attached to standoffs 80 and 82 of stator wafer 44. An exemplary configuration of the beam structure is most clearly shown by folded beams 47 in the exploded perspective view of FIG. 3.

While an exemplary method of forming slider assembly 40 of the present invention has been described above, it should be understood that numerous variations and modifications of the method may be made while still practicing the present invention. For example, although the step of forming the mechanical structure of rotor wafer 46 is shown in FIG. 11 as occurring at the end of the process of forming slider assembly 40, this step could also be performed prior to fabrication of transducing head 26 on rotor wafer 46. In order to implement this modified method, it may be necessary in some circumstances to deposit a sacrificial fill material, such as germanium, silicon germanium or silicon dioxide for example, to planarize and mechanically constrain the movable elements of rotor wafer 46 while transducing head 26 is being fabricated. Transducing head 26 and bond pads 58, 60, 62 and 64 may be fabricated on rotor wafer 46 either before or after bonding of rotor wafer 46 to stator wafer 44.

In another alternate method of the present invention, the mechanical structure of rotor wafer 46 may be formed before rotor wafer 46 is bonded to stator wafer 44. This embodiment may require the use of a temporary handle wafer to provide structural stability during fabrication of the rotor mechanical structure, transducing head 26 and bond pads 58, 60, 62 and 64. The etch of the mechanical structure of rotor wafer 46 may also be performed from the back side of the wafer, opposite the side carrying transducing head 26. Another alternative is to partially etch the mechanical structure of rotor wafer 46 from the back side of the wafer, leaving only a small amount of material to hold the beams of rotor wafer 46 together. Rotor wafer 46 is then bonded to stator wafer 44, and a release etch is performed to remove the material holding the beams together. This alternative could minimize potential complications associated with bonding rotor wafer 46 with mechanically moving parts to stator wafer 44, and also could reduce the need for precise masking and etching from the top of rotor wafer 46 in order to preserve transducing head 26.

The exemplary embodiment of the present invention is illustrated and described above with parallel plate geometry for the electrostatic microactuator formed by stator electrodes 45a and 45b and rotor electrodes 48. It should be understood that a variety of electrode configurations may be used to realize the electrostatic microactuator, such as a comb-type geometry or other arrangements. In addition, the voltage difference applied between stator electrodes 45a and 45b and rotor electrodes 48 may be realized by applying voltages of opposite polarities to the electrodes, or by holding rotor electrodes 48 at ground potential while positive or negative voltages are applied to stator electrodes 45a and 45b. One potential advantage of holding rotor electrodes 48 at ground potential is that noise interactions with transducing head 26 are minimized.

The present invention therefore provides a microactuator and a method of forming the microactuator that enables high resolution head positioning to be performed in a disc drive at high frequencies. This is achieved in large part because only a relatively small mass of material is moved by the microactuator, the small mass being a rotor portion carrying the transducing head. The microactuator is relatively simple to fabricate as well, utilizing well-known techniques such as reactive ion etching and wafer bonding to form the features of the microactuator, with the head being formed according to conventional techniques as well. The present invention is therefore a cost-effective, high performance microactuator for use in a disc drive system.

Although the present invention has been described with reference to preferred embodiments, workers skilled in the art will recognize that changes may be made in form and detail without departing from the spirit and scope of the invention.

What is claimed is:

1. A slider assembly for selectively altering a position of a transducing head with respect to a track of a rotatable disc having a plurality of concentric tracks, comprising:
    a slider wafer arranged to be supported by a disc drive support structure;
    a stator bonded to the slider wafer, the stator including at least one stator electrode and at least one standoff; and
    a rotor bonded to the stator at the at least one standoff, the rotor having a frame portion bonded to the stator and a head-carrying portion attached to the frame portion by a flexible beam structure, the head-carrying portion carrying the transducing head, supporting at least one rotor electrode adjacent to the at least one stator electrode, and being moveable with respect to the frame portion in response to a voltage difference between the at least one rotor electrode and the at least one stator electrode.

2. The slider assembly of claim 1, wherein the rotor is bonded to the stator by a conductive interlayer film.

3. The slider assembly of claim 1, wherein the at least one rotor electrode and the at least one stator electrode are arranged as a parallel plate electrostatic microactuator.

4. The slider assembly of claim 1, wherein the at least one rotor electrode and the at least one stator electrode are arranged as a comb-type electrostatic microactuator.

5. The slider assembly of claim 1, wherein the at least one stator electrode is connected to a first input for selectively controlling a potential applied thereto.

6. The slider assembly of claim 5, wherein the at least one rotor electrode is connected to a second input for selectively controlling a potential applied thereto.

7. The slider assembly of claim 5, wherein the at least one rotor electrode is connected to a fixed potential.

8. A slider assembly for selectively altering a position of a transducing head with respect to a track of a rotatable disc having a plurality of concentric tracks, comprising:
    a slider wafer arranged to be supported by a disc drive support structure;
    a stator wafer bonded to the slider wafer by an insulating film, the stator wafer including a plurality of stator electrodes;
    a rotor wafer bonded to the stator wafer, the rotor wafer having a frame portion conductively bonded to the stator wafer and a head-carrying portion attached to the frame portion by a flexible beam structure, the head-carrying portion carrying the transducing head, supporting at least one rotor electrode adjacent to the stator electrodes, and being movable with respect to the frame portion in response to a voltage difference between the at least one rotor electrode and the stator electrodes;
    an insulating layer on the rotor wafer;
    a first plurality of bond pads on the insulating layer electrically connected to the stator electrodes by first conductive vias;
    a second plurality of bond pads on the insulating layer electrically connected to the transducing head by conductive traces; and
    at least one bond pad on the insulating layer electrically connected to the rotor electrodes by second conductive vias.

9. The slider assembly of claim 8, wherein the stator wafer comprises:
    a first stator portion connected to a first set of stator electrodes for coupling to a first voltage;
    a second stator portion connected to a second set of stator electrodes for coupling to a second voltage;
    a third stator portion connected through the rotor wafer to the at least one rotor electrode for coupling to a third voltage, wherein the first, second and third stator portions are electrically isolated from one another.

10. A slider assembly for selectively altering a position of a transducing head with respect to a track of a rotatable disc having a plurality of concentric tracks, comprising:
    a slider wafer arranged to be supported by a disc drive support structure;
    a stator bonded to the slider wafer, the stator including at least one standoff; and
    a rotor bonded to the stator at the at least one standoff, the rotor carrying the transducing head and being movable with respect to the stator.

11. The slider assembly of claim 10, wherein the stator includes at least one stator electrode and the rotor includes at least one rotor electrode, and wherein the rotor is movable with respect to the stator in response to a voltage difference between the at least one stator electrode and the at least one rotor electrode.

12. The slider assembly of claim 11, wherein the at least one rotor electrode and the at least one stator electrode are arranged as a parallel plate electrostatic microactuator.

13. The slider assembly of claim 11, wherein the at least one rotor electrode and the at least one stator electrode are arranged as a comb-type electrostatic microactuator.

14. The slider assembly of claim 11, wherein the at least one stator electrode is connected to a first input for selectively controlling a potential applied thereto.

15. The slider assembly of claim 14, wherein the at least one rotor electrode is connected to a second input for selectively controlling a potential applied thereto.

16. The slider assembly of claim 14, wherein the at least one rotor electrode is connected to a fixed potential.

17. The slider assembly of claim 10, wherein the rotor includes a frame portion bonded to the stator and a head-carrying portion attached to the frame portion by a flexible beam structure, the head-carrying portion carrying the transducing head and being moveable with respect to the frame portion.

18. The slider assembly of claim 10, wherein the rotor is bonded to the stator by a conductive interlayer film.

* * * * *

UNITED STATES PATENT AND TRADEMARK OFFICE
CERTIFICATE OF CORRECTION

PATENT NO. : 6,697,232 B1
DATED : February 24, 2004
INVENTOR(S) : Roger L. Hipwell Jr. et al.

It is certified that error appears in the above-identified patent and that said Letters Patent is hereby corrected as shown below:

Column 1,
Line 50, delete "make", insert -- made --

Column 2,
Line 12, delete "by disc", insert -- by a disc --

Column 3,
Line 29, delete "56", insert -- 46 --

Column 5,
Line 3, delete "conducting", insert -- conductive --

Signed and Sealed this

Twenty-eighth Day of June, 2005

JON W. DUDAS
*Director of the United States Patent and Trademark Office*